(12) United States Patent
Bergstraesser et al.

(10) Patent No.: US 8,478,779 B2
(45) Date of Patent: Jul. 2, 2013

(54) DISAMBIGUATING A SEARCH QUERY BASED ON A DIFFERENCE BETWEEN COMPOSITE DOMAIN-CONFIDENCE FACTORS

(75) Inventors: Thomas F. Bergstraesser, Kirkland, WA (US); Bert Casper, Redmond, WA (US); Robert David Berg, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 321 days.

(21) Appl. No.: 12/468,199

(22) Filed: May 19, 2009

(65) Prior Publication Data
US 2010/0299336 A1    Nov. 25, 2010

(51) Int. Cl.
*G06F 17/30*    (2006.01)

(52) U.S. Cl.
USPC .......................................................... 707/771

(58) Field of Classification Search
CPC ................................................ G06F 17/30864
USPC ................................................ 707/723, 771
See application file for complete search history.

(56) References Cited

U.S. PATENT DOCUMENTS

| | | | |
|---|---|---|---|
| 6,311,194 B1 | 10/2001 | Sheth | |
| 7,103,593 B2 | 9/2006 | Dean | |
| 7,174,507 B2 * | 2/2007 | Baudin et al. | 715/234 |
| 7,260,571 B2 | 8/2007 | Amitay | |
| 7,451,155 B2 * | 11/2008 | Slackman et al. | 707/999.1 |
| 7,562,069 B1 * | 7/2009 | Chowdhury et al. | 707/3 |
| 7,814,085 B1 * | 10/2010 | Pfleger et al. | 707/708 |
| 2001/0037328 A1 | 11/2001 | Pustejovsky | |
| 2003/0217052 A1 | 11/2003 | Rubenczyk | |
| 2004/0210443 A1 * | 10/2004 | Kuhn et al. | 704/276 |
| 2006/0047617 A1 * | 3/2006 | Bacioiu et al. | 706/59 |
| 2006/0122979 A1 * | 6/2006 | Kapur et al. | 707/3 |
| 2006/0155693 A1 | 7/2006 | Chowdhury | |
| 2006/0190439 A1 * | 8/2006 | Chowdhury et al. | 707/3 |
| 2006/0235843 A1 | 10/2006 | Musgrove | |
| 2006/0248045 A1 | 11/2006 | Toledano et al. | |
| 2007/0208706 A1 * | 9/2007 | Madhavan et al. | 707/3 |
| 2007/0244863 A1 * | 10/2007 | Adams et al. | 707/3 |
| 2008/0040308 A1 | 2/2008 | Ranganathan et al. | |
| 2008/0154896 A1 * | 6/2008 | Sarathy et al. | 707/6 |
| 2009/0019028 A1 * | 1/2009 | Norris et al. | 707/5 |
| 2010/0094826 A1 * | 4/2010 | Rouhani-Kalleh | 707/705 |

OTHER PUBLICATIONS

Ruihua Song et al., "Identification of Ambiguous Queries in Web Search", 45 Information Processing and Management, available online Nov. 8, 2008, pp. 216-229.*

(Continued)

*Primary Examiner* — Rehana Perveen
*Assistant Examiner* — Scott A Waldron
(74) *Attorney, Agent, or Firm* — Shook Hardy & Bacon LLP

(57) ABSTRACT

A query may be ambiguous when the domain-confidence factors indicate a high likelihood that the search query may belong to two or more domains. A domain is a subject matter category such as shopping, sports, entertainment, music, or politics. A domain-confidence factor indicates the likelihood that a search query is related to a particular domain. Upon determining that a search query is ambiguous, embodiments of the present invention may present an interface that allows the user to place the search query into one or more domains. Updated search results, or other objects, may be returned based on the selection of a domain by the user.

19 Claims, 9 Drawing Sheets

OTHER PUBLICATIONS

Christopher Phillip Town, Ontology based Visual Information Processing, University of Cambridge Computer Laboratory, A thesis submitted for the degree of Doctor of Philosophy at the University of Combridge, Dec. 2004, pp. 1-242, Cambridge, CB2 1TQ, England, http://www.cl.cam.ac.uk/cpt23/papers/TownPHD.pdf.

* cited by examiner

DISAMBIGUATING A SEARCH QUERY BASED ON A DIFFERENCE BETWEEN COMPOSITE DOMAIN-CONFIDENCE FACTORS

BACKGROUND

Search engines may rank search results in order of responsiveness to a user's query. Various methods are used to determine the relevance of a search result. A result may be more relevant if the result has a high number of links from other web pages, a high number of users that click on the result from a search result page, or a high user dwell time on a page. Advertisements and paid results that have a subject matter related to the search query may also be presented to the user with the search results.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention generally relate to a method of disambiguating a search query provided by a user. Initially, a search query received from a user may be assigned confidence factors for one or more domains. A domain is a subject matter category such as shopping, sports, entertainment, music, or politics. A domain-confidence factor indicates the likelihood that a search query is related to a particular domain. For example, a domain-confidence factor may indicate there is a high likelihood that the search query is related to the music domain. A query is ambiguous when the domain-confidence factors indicate a high likelihood that the search query may belong to two or more domains. Upon determining that a search query is ambiguous, embodiments of the present invention may present an interface that allows the user to place the search query into one or more domains. Updated search results, or other objects may be returned based on the selection of a domain by the user. For example, advertisements, paid results, news articles, and other items related to search results may be updated based on the user selecting a domain for the search query.

BRIEF DESCRIPTION OF THE DRAWINGS

Embodiments of the invention are described in detail below with reference to the attached drawing figures, wherein.

DETAILED DESCRIPTION

Figure 1:
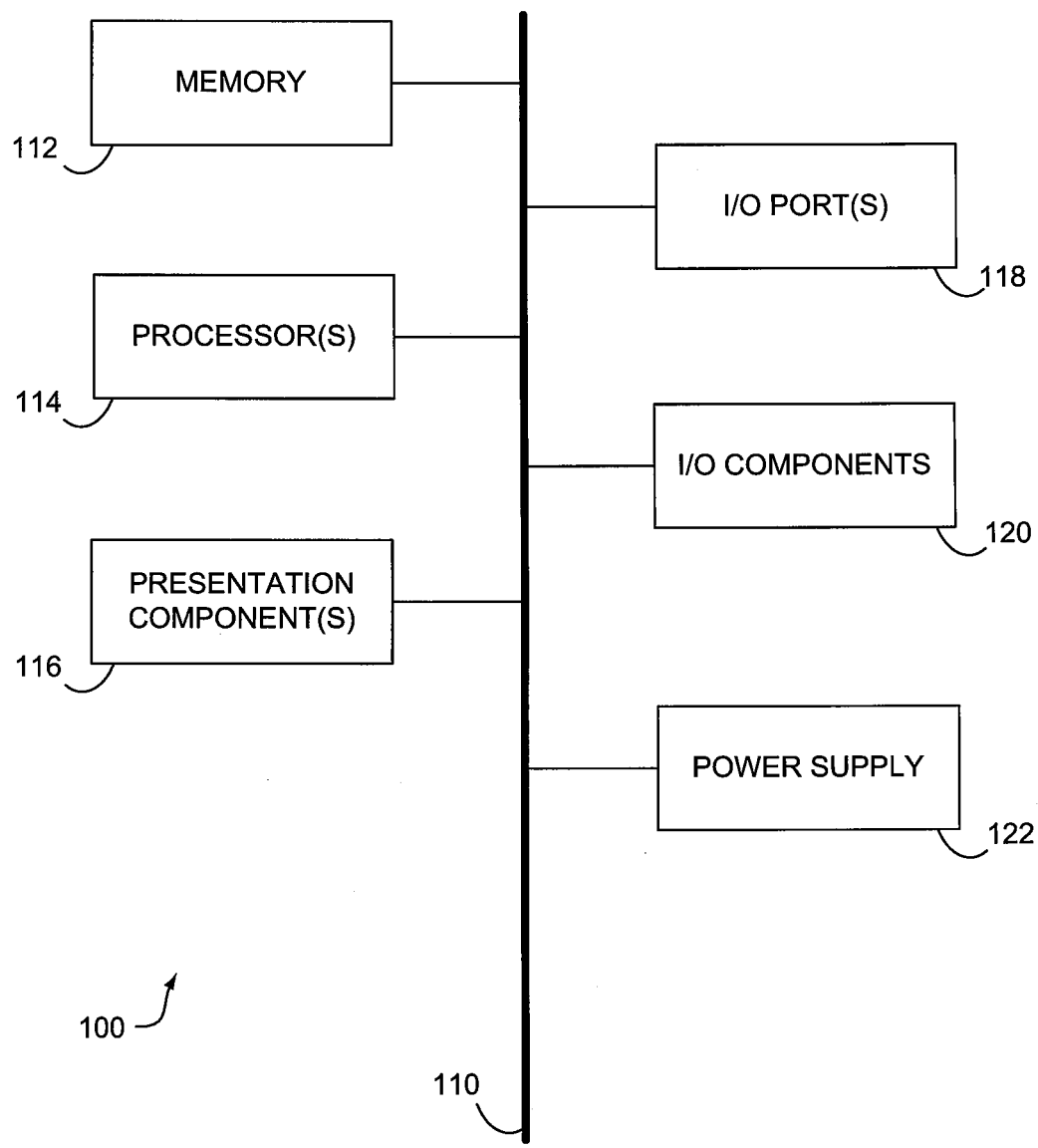
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention generally relate to a method of disambiguating a search query provided by a user. Initially, a search query received from a user may be assigned confidence factors for one or more domains. A domain is a subject matter category such as shopping, sports, entertainment, music, or politics. A domain-confidence factor indicates the likelihood that a search query is related to a particular domain. For example, a domain-confidence factor may indicate there is a high likelihood that the search query is related to the music domain. A query may be ambiguous when the domain-confidence factors indicate a high likelihood that the search query may belong to two or more domains. Upon determining that a search query is ambiguous, embodiments of the present invention may present an interface that allows the user to place the search query into one or more domains. Updated search results, or other objects, may be returned based on the selection of a domain by the user. For example, advertisements, paid results, news articles, and other items related to search results may be updated based on the user selecting a domain for the search query.

Accordingly, in one embodiment, one or more computer-readable media having computer-executable instructions embodied thereon for performing a method of determining whether a search query is ambiguous. The method includes receiving, at a server, a search query sent from a computing device. The method also includes generating a composite domain-confidence factor for each of a plurality of domains. A domain is a subject-matter category. And, the composite domain-confidence factor indicates a probability that the search query is associated with an individual domain. The method also includes determining that the search query is ambiguous because a difference between a highest composite domain-confidence factor and a second-highest composite domain-confidence factor generated for the search query is less than a threshold value. The highest composite domain-confidence factor is associated with a first domain and the second-highest composite domain-confidence factor is associated with a second domain. The method also includes, in response to said determining that the search query is ambiguous, displaying a user interface that allows the user to filter search results according to the first domain or the second domain.

In another embodiment, a computerized method of soliciting search-query domain information from a user that submits an ambiguous search query. The method includes receiving, at a server, a search query from a computing device associated with a user. The method also includes generating one or more domain-confidence factors for each domain within a domain ontology by submitting the search query to a plurality of domain classifiers, each of which generates a domain-confidence factor that expresses the probability that the search query is associated with an individual domain. The plurality of domain classifiers includes at least two domain classifiers that are associated with the same individual domain. A domain is a subject-matter category. The method also includes calculating a composite domain-confidence factor for each domain within the domain ontology based on the one or more domain-confidence factors generated by the plurality of domain classifiers for said each domain. The method further includes determining a highest composite domain-confidence factor calculated for the search query, wherein the highest-composite domain-confidence factor is associated with a first domain. The method also includes determining a second-highest composite domain-confidence factor calculated for the search query, wherein the second-highest composite domain-confidence factor is associated with a second domain. The method further includes determining that the search query is ambiguous because a difference between the highest composite domain-confidence factor and the second-highest composite domain-confidence factor is less than a threshold amount. The method also includes, upon said determining that the search query is ambiguous, displaying a user interface that allows the user to select an intended domain for the search query, wherein the user interface allows the user to select one or more of the first domain and second domain.

In yet another embodiment, one or more computer-readable media having computer-executable instructions embodied thereon for performing a method of disambiguating a search query. The method includes communicating a user interface to a separate computing device that displays the user interface to a user, wherein the user interface includes a first portion that receives a search query from the user. The method also includes receiving the search query through the user interface. The method also includes determining that the search query is ambiguous based on the domain classification factors calculated for the search query. The method further includes communicating, to the computing device, a second portion of the user interface that displays two or more domains into which the search query has the highest probability of being categorized, wherein the two or more domains are user selectable.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120*t*. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-storage media. By way of example, and not limitation, computer-readable media may comprise Random Access Memory (RAM); Read Only Memory (ROM); Electronically Erasable Programmable Read Only Memory (EEPROM); flash memory or other memory technologies; Compact Disk Read-Only Memory (CDROM), digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Exemplary System Architecture

Figure 2:
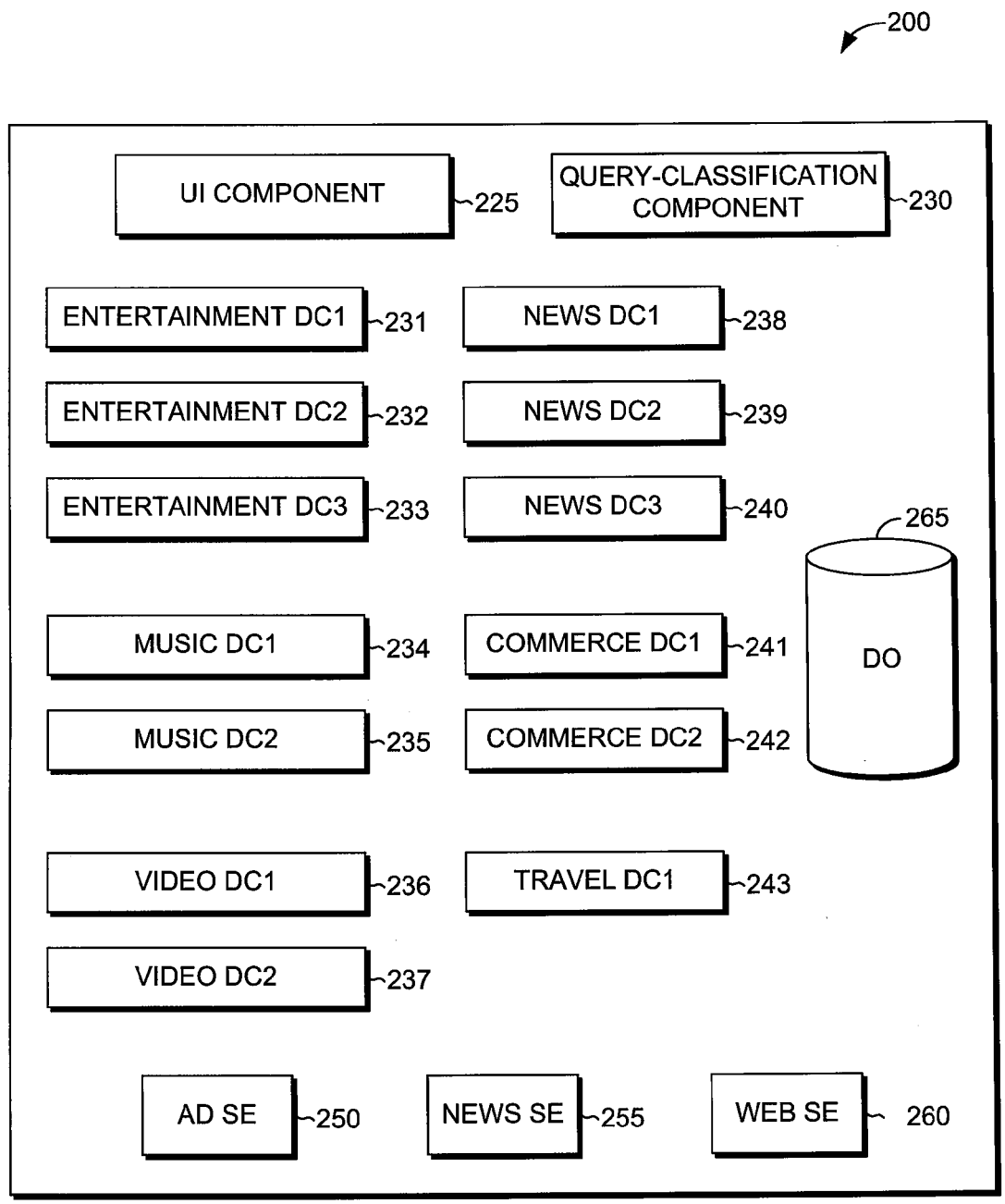
FIG. 2 is a block diagram of an exemplary computing system architecture of a search component suitable for disambiguating a query, in accordance with an embodiment of the present invention.

Turning now to FIG. 2, a block diagram is illustrated that shows an exemplary computing system architecture of a search component 200 suitable for disambiguating a query. It will be understood and appreciated by those of ordinary skill in the art that the search component 200 shown in FIG. 2 is merely an example of one suitable computing system and is not intended to suggest any limitation as to the scope of the use or functionality of embodiments of the invention. Neither should the search component 200 be interpreted as having any dependency or requirement related to any single component/module or combination of components/modules illustrated therein.

The search component 200 includes a user-interface component 225, a query-classification component 230, a first-entertainment domain classifier 231, a second-entertainment domain classifier 232, a third-entertainment domain classifier 233, a first-music domain classifier 234, a second-music domain classifier 235, a first-video domain classifier 236, a second-video domain classifier 237, a first-news domain classifier 238, a second-news domain classifier 239, a third-news domain classifier 240, a first-commerce domain classifier 241, a second-commerce domain classifier 242, a travel-domain classifier 243, an advertisement search engine 250, a news search engine 255, a web search engine 260 and a domain-ontology data store 265. The search component 200 may reside on a single computing device, such as computing device 100 shown in FIG. 1. Alternatively, search component 200 may reside in a distributed computing environment that includes multiple computing devices (e.g., servers, clients) coupled with one another via one or more networks. Such networks may include, without limitation, one or more local area networks (LANs) and/or one or more wide area networks (WANs), enterprise-wide computer networks, intranets, and the Internet.

The user-interface component 225 provides a user interface to a user connected to the search component 200 through a client computing device. The user interface may be communicated over a network (e.g., the Internet) and displayed to the user through a computing device the user is utilizing. In one embodiment, the user interface displayed by the user-interface component includes multiple portions. A query-input portion of the user interface is for receiving a search query. A domain-selection portion of the user interface is for allowing the user to select a domain for the query. A web-results portion of the user interface is for presenting search results that are responsive to the search query. A news-results portion of the user interface is for presenting news articles responsive to the query. An ad portion of the user interface is for presenting advertisements to the user. In one embodiment, the user interface is a web page accessed by a user.

The query-classification component 230 determines whether a search query is ambiguous and solicits user feedback to disambiguate an ambiguous query. In one embodiment, the query-classification component 230 receives a search query, for example from the user-interface component 225, and sends it to one or more domain classifiers. The operation of the domain classifier will be explained in more detail subsequently. In brief, a domain classifier determines the likelihood that a particular search query falls within a particular domain. For example, a domain classifier for the music domain may determine the likelihood that the search query "Seal" should be characterized as a music query. The query-classification component 230 may send the search query to multiple domain classifiers for the same domain. For example, the first-entertainment domain classifier 231, the second-entertainment domain classifier 232, and the third-entertainment domain classifier 233 all determine the likelihood of whether a particular query should be classified into the entertainment domain. When multiple domain-confidence factors are determined for a particular domain, the query-classification component 230 determines a composite domain-confidence factor for the particular domain. For example, if domain classifiers 231, 232, and 233 each calculate a domain-confidence factor for a particular query, then these three confidence factors would be combined by the query-classification component 230 into a single composite confidence factor for the entertainment domain. The various individual domain-confidence factors may be combined by giving equal weight to each individual domain-confidence factor. When equal weight is given, the composite domain-confidence factor is essentially an average of the multiple domain-confidence factors calculated for a particular domain. In another embodiment, a weighted average, which gives more weight to one or more of the domain classifiers, is used. This may be desirable if one of the domain classifiers is newer or otherwise deemed to be more accurate. The domain-confidence factors generated by the individual domain classifiers may need to be normalized to the same scale. For example, if the first-entertainment domain classifier 231 calculates a domain classification factor between zero and one, while the second-entertainment domain classifier 232 and the third-entertainment domain classifier 233 calculate a domain classification factor between zero and five, then the domain classification factor calculated by the first-entertainment domain classifier 231 may need to be multiplied by five so that the various domain classification factors are compared on an equal basis.

Upon receiving domain classification factors and generating composite domain classification factors, the query-classification component 230 determines whether the search query is ambiguous. In one embodiment, the search query is ambiguous if the difference between the composite domain-classification factor for a first domain and a composite domain-confidence factor for a second domain is less than a threshold amount. In one embodiment, the difference between the highest composite domain-confidence factor and the second-highest composite domain-confidence factor is evaluated. In general, if one of the composite domain-confidence factors is much higher than the others, then the search query is not ambiguous. The query may be ambiguous when two or more composite domain-confidence factors are similar values.

The query-classification component 230 may also use the domain ontology in domain-ontology data store 265 to confirm that the query is ambiguous. The domain ontology may contain relationships between the various domains for which confidence factors are calculated. The relationships may be hierarchical in nature. Parent and child nodes or sibling nodes sharing the same parent node may be considered closely related. The ontology need not be hierarchical. The closeness of domain relationships may be defined in other manners, for example in the domain definition. The query-classification component 230 may consult the domain-ontology data store 265 to determine if the two domains with two-highest domain-confidence factors are closely related. For example, if the two domains with the highest domain-confidence factors are entertainment and music, then the search query may be determined to be unambiguous, despite the close domain-confidence factors, because music and entertainment are closely related. In this case, the domains with the two-highest confidence factors are parent and child nodes. A search query could be classified into both entertainment and into the more specific entertainment category of music, yet not be ambiguous. Thus, the domain ontology may be used to reduce false-positive ambiguous determinations.

If the query-classification component 230 determines that the search query is ambiguous, then the query-classification component 230 causes a user interface to be presented to the user that allows the user to select one of the two or more domains into which the search query may be classified. In one embodiment, the query-classification component 230 works in conjunction with the user-interface component 225 to communicate this information to the user. Upon receiving a selection of a domain from the user, the domain-classification component may update the search results to conform to the selected domain. In one embodiment, the query-classification component 230 generates new search results by modifying the initially submitted query by adding one or more words that describe the domain that was selected by the user. For example, the domain-classification component may add "gasket" to the search query "seal" when the user selects auto parts as the preferred domain. The updated search query may then be resubmitted to one or more search engines to produce updated search results.

Search component 200 includes several clusters of domain classifiers. The first cluster determines the likelihood whether a query is seeking information from the entertainment domain. The first cluster includes the first-entertainment domain classifier 231, the second-entertainment domain classifier 232, and the third-entertainment domain classifier 233. The second cluster determines the likelihood that the query is seeking information from the music domain. The second cluster includes the first-music domain classifier 234 and the second-music domain classifier 235. The third cluster includes the first-video domain classifier 236 and the second-video domain classifier 237. The domain classifiers in the third cluster determine the likelihood that the query is seeking information from the video domain. The fourth cluster includes the first-news domain classifier 238, the second-news domain classifier 239, and the third-news domain classifier 240. The domain classifiers in cluster four determine the likelihood that the search query is looking for information from the news domain. The fifth cluster includes the first-commerce domain classifier 241 and the second-commerce domain classifier 242. The domain classifiers in the fifth cluster determine the likelihood that the query is looking for information from the commerce domain. The sixth cluster includes the travel domain classifier 243. Thus, cluster six includes just a single domain classifier. The travel domain classifier 243 determines the likelihood that the search query is seeking information from the travel domain. Thus, the domain clusters may include a number of different domain classifiers or just a single domain classifier.

A domain classifier, such as the ones listed previously, determines the likelihood that a search query is seeking information from a particular domain. As described previously, a domain is a subject matter category. In one embodiment, a domain classifier is built by asking people to classify each of a group of queries as either related to or not related to the domain of interest. This training data, that includes feedback from perhaps multiple users, is fed into a machine-learning algorithm, such as a neural network. The machine-learning algorithm evaluates the training data and learns how to classify unfamiliar queries. Different sets of training data may be used to train different domain classifiers. In addition, different machine-learning algorithms may be used in different domain classifiers.

Search component 200 also includes the advertisement search engine 250, the news search engine 255, and the web search engine 260. The advertisement search engine 250 searches a data source containing advertisements. The advertisements may be associated to a particular domain through keywords associated with the advertisements. In one embodiment, the search engine builds a lookup index that may retrieve advertisements based on the subject matter of the query. The news search engine 255 retrieves news articles from a data source containing news articles. The news search engine 255 may return news articles responsive to an original query or a modified query.

The web search engine 260 retrieves web sites from a data source such as the Internet. The web search engine 260 may use web crawlers to build an index that enables it to quickly develop web page results. The web pages may be preclassified into domains within the index, or retrieved by keywords that are inserted into the index that describe the web page. The web search engine 260 may present search results consisting of links to a web page with a partial description of the web page.

The domain-ontology data store 265 includes a domain ontology. A domain ontology includes a list of domains for which domain classifiers have been trained. The domain ontology may include the description or definition of the various domains within the domain ontology. In addition, a relationship between domains within the domain ontology may be stored within the domain ontology. The relationships may be hierarchical. As described previously, the relationships may be used to determine whether a search query is actually ambiguous. In one embodiment, when two closely related domains have a high likelihood of relating to the query, then the query-classification component 230 may determine that the query is, in fact, not ambiguous and present search results from the two closely related domains.

Figure 3:
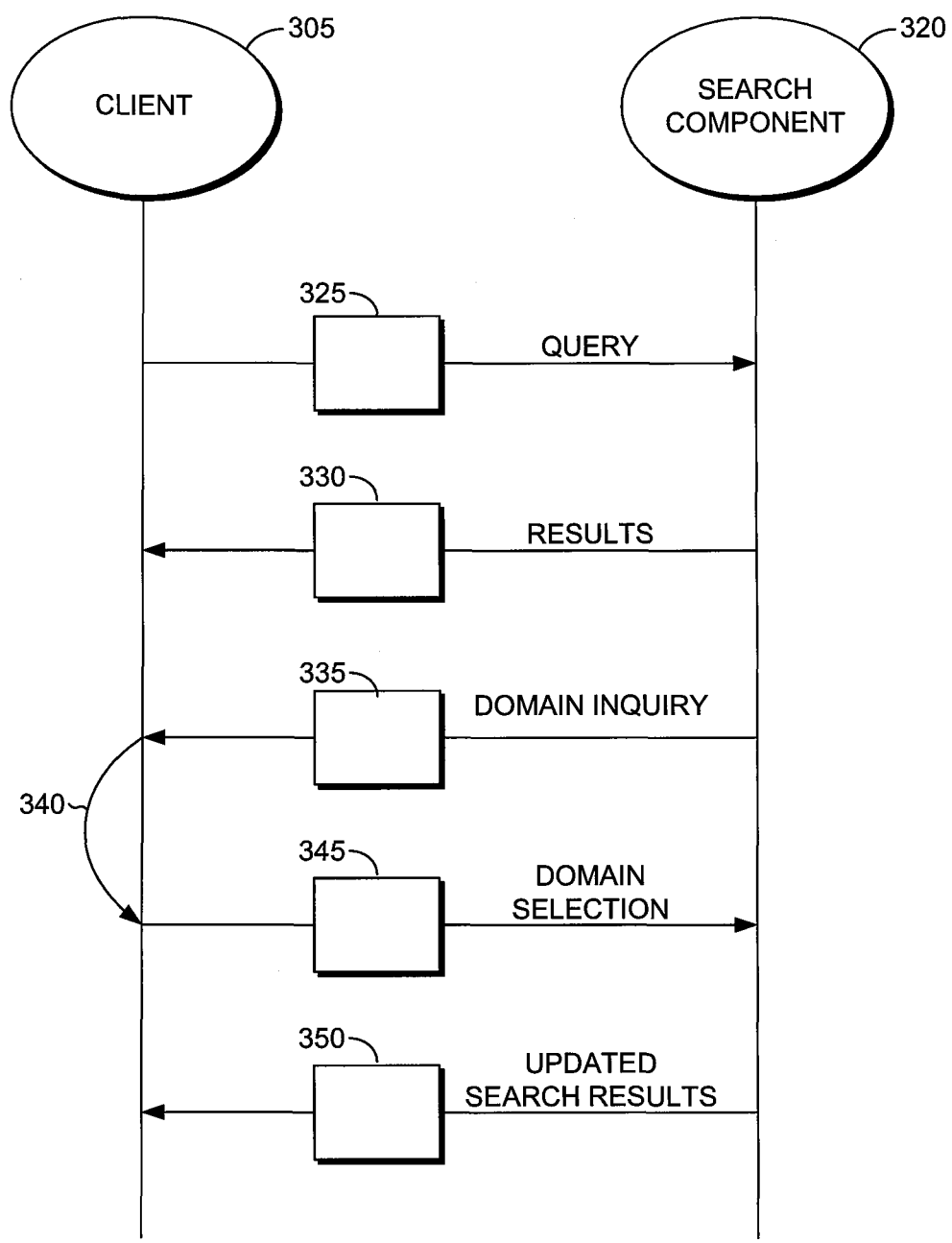
FIG. 3 is a diagram showing communications occurring between a client device and a search component during the disambiguation of a search query, in accordance with an embodiment of the present invention.

Turning now to FIG. 3, is a diagram showing communications occurring between a client device 305 and a search component 320 during the disambiguation of a search query, in accordance with an embodiment of the present invention. The client device 305 may be similar to the exemplary computing environment 100 illustrated with reference to FIG. 1. The search component 320 may be similar to the search component 200 shown with reference to FIG. 2. Initially, a query 325 is sent from the client device 305 to the search component 320. The query 325 may be entered into a user interface generated by the search component 320 and accessed via the Internet by the client device 305. The query may be a keyword query, which may or may not include Boolean operators. In another embodiment, the query is a semantic query that includes a group of words forming a phrase or a sentence.

In response to receiving the query 325, the search component 320 sends search results 330 to the client device 305. The search results may be displayed on a user interface generated by the search component 320. The search results may be a combination of news results, Internet web pages, advertisements, music listings, video listings, and lists of other items. The search results may be presented as selectable links to content that matches the search criteria.

In addition to sending the search results 330, the search component 320 sends a domain inquiry 335 to the client device 305. The domain query may be part of a user interface that contains the search results 330. The domain inquiry 335 is sent because the search component 320 determined that the intended domain of the query 325 was ambiguous. The domain inquiry 335 asks the user of the client device 305 to specify a domain, or category, to which the search query 325 is directed. The domains within the domain inquiry 335 may be the most likely domains into which the user intended to direct the search query 325. As described previously, these domains may be identified based on the confidence factors calculated for them.

The user selects 340 one of the domains within the domain inquiry 335. In one embodiment, the user selects 340 the domain through the user interface presented to the client device 305 by the search component 320. The domain selection 345 is then communicated from the client device 305 to a search component 320. Upon receiving the domain selection 345, the search component 320 generates updated search results based on the selected domain. The updated search results may be tailored to the selected domain. The updated search results 350 are then communicated to the client device 305. The updated search results 350 may be communicated as part of a user interface presenting search results to the client device 305. The updated search results 350 may include news items, videos, Internet web pages, advertisements, paid search results, or any other object from a data source searched by the search component 320.

Figure 4:
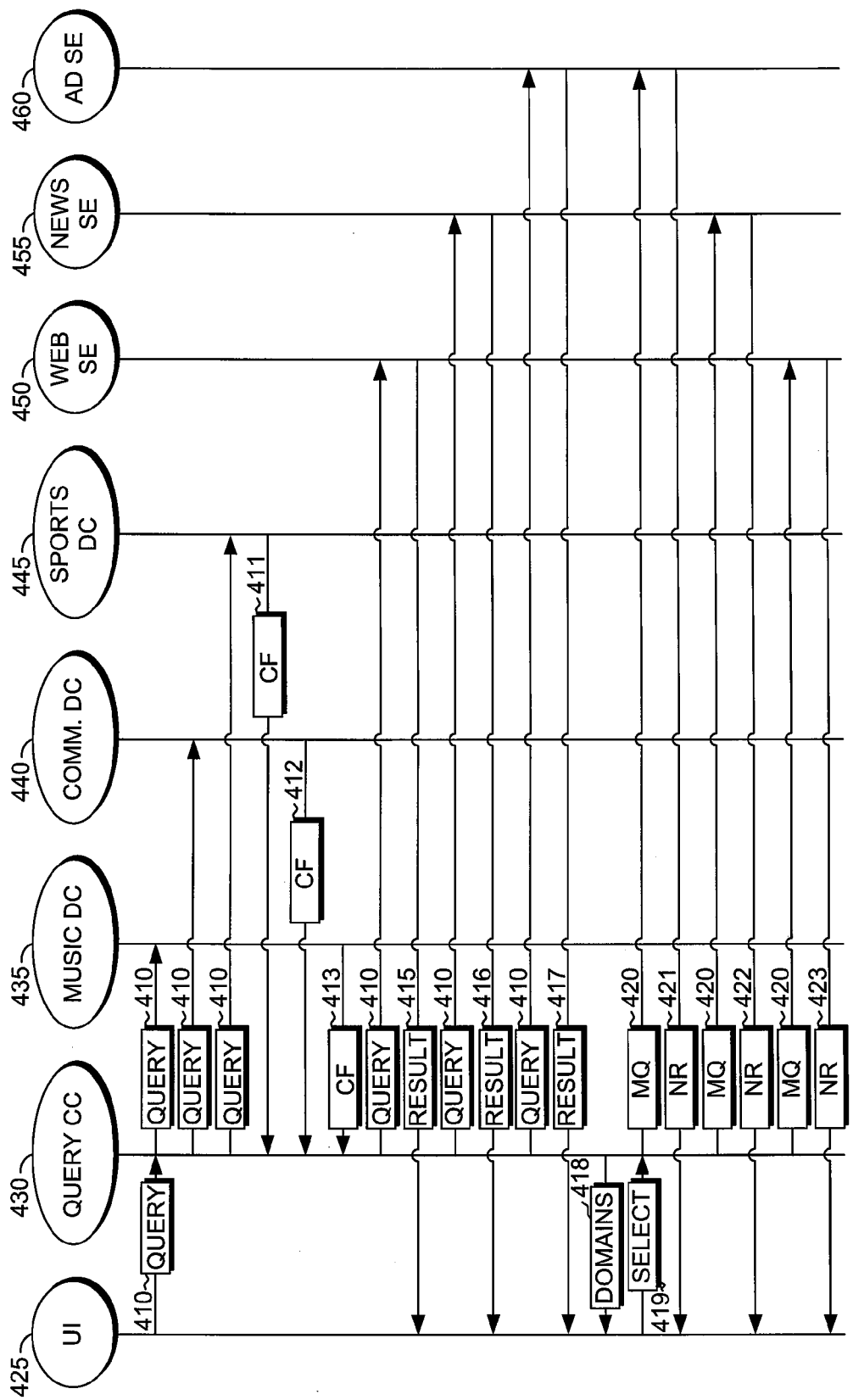
FIG. 4 is a diagram showing communications occurring between components of a search component during the disambiguation of a search query, in accordance with an embodiment of the present invention.

Turning now to FIG. 4, communications occurring between components of a search component during the disambiguation of a search query are shown, in accordance with an embodiment of the present invention. The user-interface component 425 may be similar to the user-interface component 225 described previously with reference to FIG. 2. The query classifier 430 may be similar to the query-classification component 230 described previously with reference to FIG. 2. The music domain classifier 435, the commerce domain classifier 440, and the sports domain classifier 445 may be similar to those described previously with reference to FIG. 2. A single domain classifier is shown of each domain, but embodiments of the invention could use clusters of domain classifiers as described previously. If clusters of domain classifiers were used, then the communications sent to the single domain classifier would be repeated for each classifier used. Additionally, for the sake of simplicity, only three domains are represented by the classifiers shown in FIG. 4. Embodiments of the invention may generate domain-confidence factors for an almost unlimited number of domains.

The web search engine 450, the news search engine 455, and the ad search engine 460 may be similar to the search engines described previously with reference to FIG. 2. In one embodiment, the web search engine 450 is directed to retrieve references to web pages, the news search engine 455 is directed to retrieve news articles, and the ad search engine 460 is directed to retrieve advertisements.

Initially, a query 410 is received by the user-interface component 425 and communicated to the query-classification component 430. The query may be received by the user-interface component 425 in a method similar to that described with reference to FIG. 3. In brief, the user-interface component 425 may receive the query 410 from a user that enters the query through a computing device connected to the user-interface component 425 over a network.

The query-classification component 430 sends query 410 to the music domain classifier 435, the commerce domain classifier 440, and the sports domain classifier 445. Each of the domain classifiers generates a domain-confidence factor for the query 410. The sports domain classifier 445 returns a domain-confidence factor 411 to the query-classification component 430. Though not shown, if multiple domain classification factors are provided for the sports domain, the query-classification component 430 may generate a composite domain-confidence factor for the sports domain. If, as shown, only a single domain-confidence factor 411 is provided, then the single domain-confidence factor 411 becomes the composite domain-classification factor for the sports domain. The commerce domain classifier communicates confidence factor 412 to the query-classification component 430. The music domain classifier 435 communicates confidence factor 413 to the query-classification component 430.

The query-classification component 430 sends query 410 to the web search engine 450, the news search engine 455, and the ad search engine 460. In one embodiment, the query 410 is sent to the search engines at the same time the query 410 is sent to the domain classifiers. The web search engine 450 sends the web results 415 that are responsive to the query 410 to the user-interface component 425. The news search engine 455 sends news search results 416 that are responsive to the query 410 to the user-interface component 425. The ad search engine 460 sends ad results 417 that are responsive to the query 410 to the user-interface component 425. The results 415, 416, and 417 may be combined on a user interface that has been transmitted to the computing device that originally submitted the query to the user-interface component 425.

Upon receiving the confidence factors 411, 412, and 413, the query-classification component 430 determines whether the query 410 is ambiguous. The process of determining whether a query is ambiguous was described previously. For the sake of illustration, query 410 was determined to be ambiguous by the query-classification component 430. Upon determining that query 410 is ambiguous, a domain inquiry 418 is sent to the user-interface component 425. The user-interface component 425 then displays the domains within the domain inquiry 418 as part of the user interface displaying the search results. Two or more domains may be displayed for a user to select. The domains displayed are the domains determined to be the most likely subject matter of query 410. Upon selecting one of the domains, the selection 419 is sent from the user-interface component 425 to the query-classification component 430.

The query-classification component then updates the search results based on the selected domain. In one embodiment, the query-classification component 430 creates a modified query 420 based on the selected domain. The modified query may be query 410 plus a keyword associated with the selected domain. For example, if the query 410 is "seal," then the modified query could be "seal & music" and the music domain is selected. The modified query 420 is sent to the web search engine 450, the news search engine 455, and the ad search engine 460. The ad search engine 460 returns updated ad search results 421 to the user-interface component 425. The news search engine 455 returns updated news search results 422 to the user-interface component 425. The web search engine 450 returns updated web results 423 to the user interface component 425. The updated results 421, 422, and 423 may then be displayed on a user interface generated by the user-interface component 425. The communications shown on FIG. 4 are just one possible combination of communications that may occur. Different communications may occur between components or be initiated by different components. For example, initially the search query 410 could be sent directly to the search engines rather than to the query-classification component 430 and then to the search engines. Also, many of the communications shown may occur simultaneously.

Figure 5:
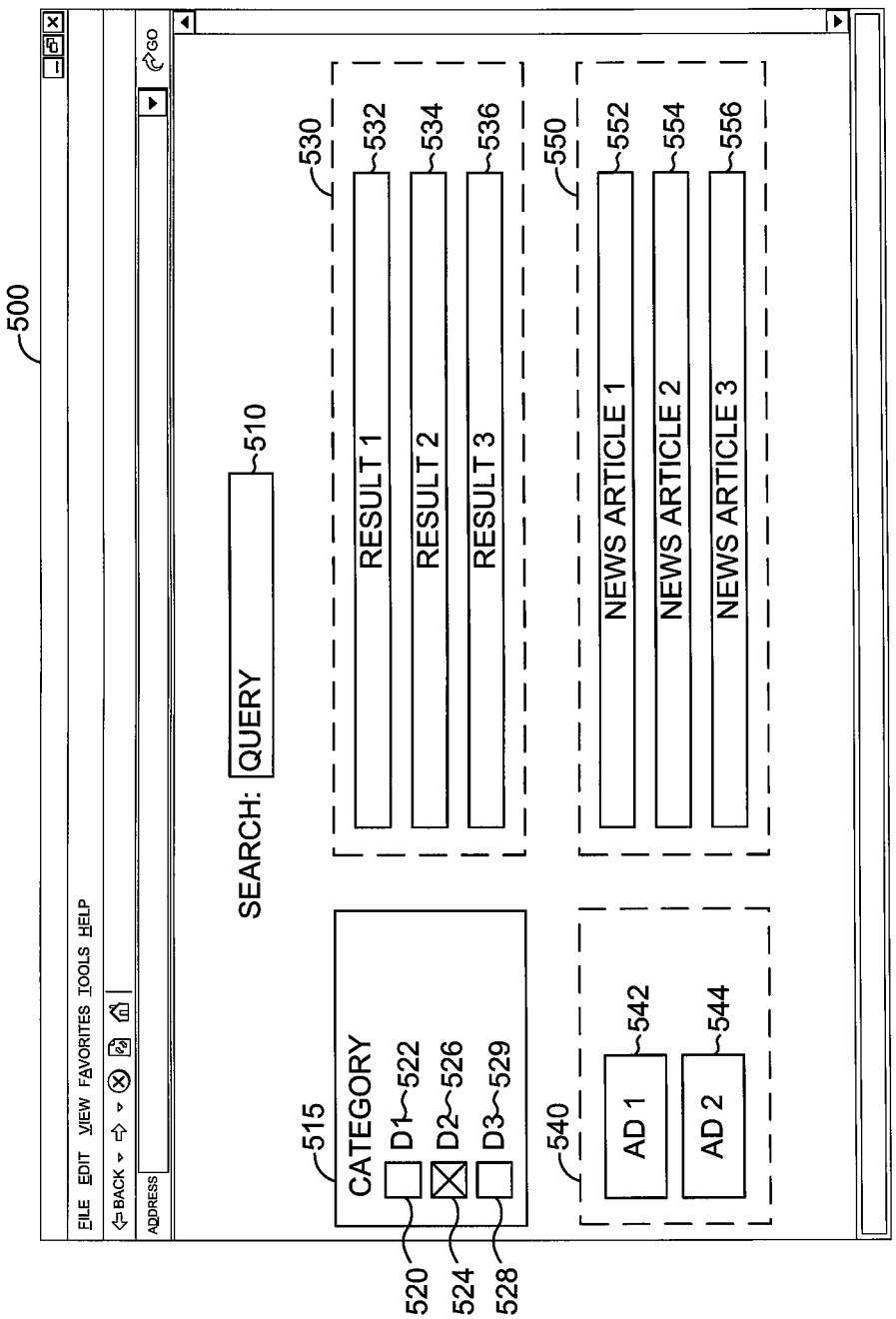
FIG. 5 is a diagram showing a user interface for displaying search results and soliciting a domain selection, according to an embodiment of the present invention.

Turning now to FIG. 5, a user interface 500 for displaying search results and soliciting a domain selection is shown, according to an embodiment of the present invention. User interface 500 may be generated within a browser window. User interface 500 includes a query input field 510. A search query may be input by a user into the search input field 510.

The search input may then be transferred to a search component that determines that the search query is ambiguous. In a case where the submitted search query is determined to be ambiguous, the disambiguation portion 515 of the user interface may display one or more domains for the user to select. The disambiguation portion 515 includes a first selection box 520 adjacent to a description of a first domain 522, a second selection box 524 adjacent to a description of the second domain 526, and a third selection button 528 adjacent to a description of the third domain 529. The domains shown in the disambiguation portion 515 are the domains most likely to be related to the query. In disambiguation portion 515, the second box 524 is shown as selected by the user. This selection would be communicated to a component that would update the search results based on the selection.

The user interface 500 also includes a web results portion 530, a news results portion 550, and an advertisements results portion 540. The web results portion 530 includes result 1 532, result 2 534, and result 3 536. The advertisement result portion 540 includes ad 1 542 and ad 2 544. News result portion 550 includes news article 1 552, news article 2 554, and news article 3 556. The web results, advertisements, and news articles may not initially reflect the selection of the second domain. In one embodiment, the initial results returned from the search query are presented simultaneously with the disambiguation portion 515.

Figure 6:
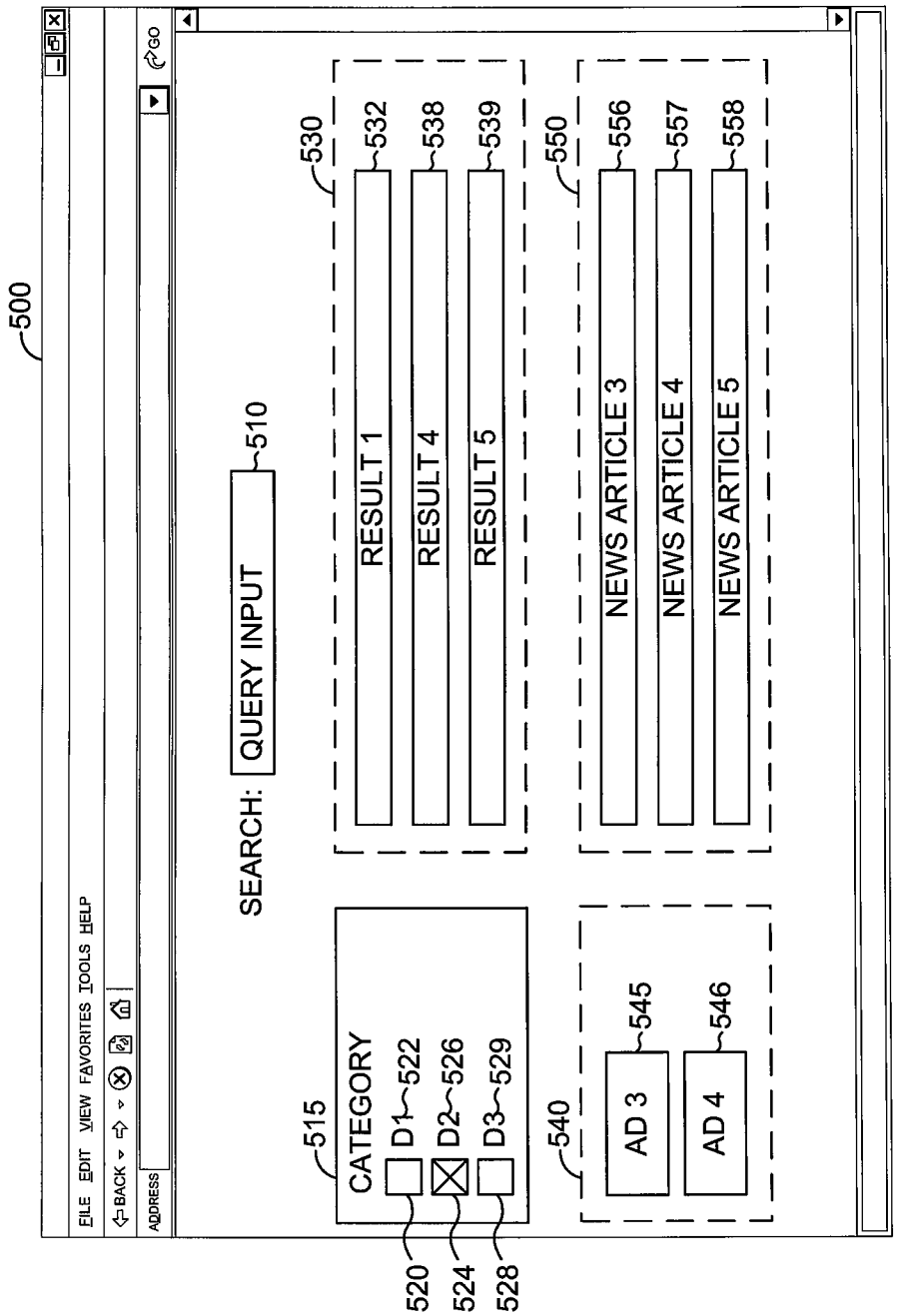
FIG. 6 is a diagram showing the changes in the various results shown on a user interface after selection of a domain, in accordance with an embodiment of the present invention.

Turning now to FIG. 6, the changes in the various results after selection of a domain are shown, in accordance with an embodiment of the present invention. User interface 500 has been updated based on the selection of the second domain. Web results portion 530 now includes result 4 538 and result 5 539 in place of result 2 534 and result 3 536. Result 4 538 and result 5 539 are new and would not have been in the top three results had the domain not been selected. However, it should be noted that the original results included result 1 532, even though the domain was not selected. This illustrates that there may be overlap between the results in the original set determined based on overall popularity of responsiveness and the modified set of results based on the selection of a domain.

The advertisement results portion 540 includes two new advertisements. Advertisement 3 545 and advertisement 4 546 are shown. The news results portion 550 includes two new news articles and a holdover from the original results. News article 3 556 is a holdover from the original results generated without the selection of the second domain. News article 4 557 and news article 5 558 are newly included based on their categorization into the second domain.

Figure 7:
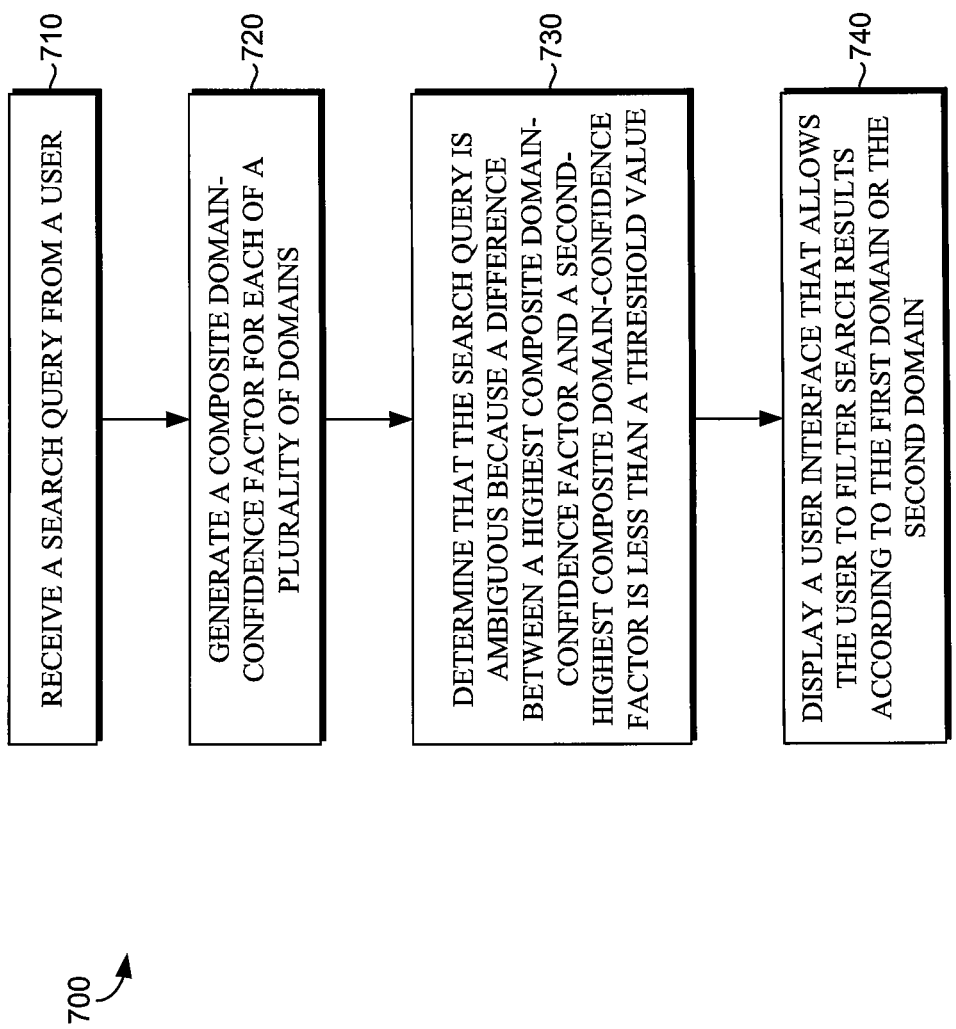
FIG. 7 is a flow chart showing a method of determining whether a search query is ambiguous, in accordance with an embodiment of the present invention.

Turning now to FIG. 7, a flow chart showing a method 700 of determining whether a search query is ambiguous is shown, in accordance with an embodiment of the present invention. In one embodiment, method 700 is performed by a search component similar to search component 200 described previously with reference to FIG. 2. The search component may be affiliated with one or more search engines that provide results that include web pages, news articles, songs, videos, and advertisements.

At step 710, a search query is received at a server. The search query is received from a computing device communicatively connected to the server. The search query may be an alpha-numeric search query. The search query may include multiple words, phrases, sentences, and numbers. In one embodiment, the search query utilizes Boolean operators.

At step 720, a composite domain-confidence factor is generated for each of a plurality of domains. A domain is a subject-matter category, such as music, entertainment, commerce, education, and travel. The composite domain-confidence factor indicates a probability that the search query is associated with an individual domain. For example, a composite-domain-confidence factor may indicate there is a 50% chance that the user who submitted the search query wanted search results from the travel domain. The composite domain-confidence factor for a particular domain may be a combination of multiple domain-confidence factors calculated by different domain classifiers for a single domain. The composite domain-confidence factor may be a weighted average or other combination of multiple domain-confidence factors. The plurality of domains could include several different domains as described previously.

At step 730, the search query is determined to be ambiguous because a difference between a highest composite domain-confidence factor and a second-highest composite domain-confidence factor generated is less than a threshold value. For example, the highest domain-confidence factor could be associated with the entertainment domain and the second-highest confidence factor could be associated with the music domain. If the highest composite confidence-factor is 0.9 and the second-highest composite domain-confidence factor is 0.8, then the query will be ambiguous if the threshold is 0.1 or greater.

At step 740, in response to determining that the search query is ambiguous, a user interface is displayed that allows the user to filter search results according to the first domain or the second domain. As indicated previously, the first and second domains are associated with the highest and second-highest composite domain-confidence factors. In one embodiment, initial search results generated from the search query are presented contemporaneously with the user interface that allows the user to filter the search results.

Upon receiving a domain selection from the user through the interface, updated search results may be displayed that are filtered based on the domain selection. In one embodiment, the search results are filtered by submitting a modified search query that includes key words associated with the selected domain. In another embodiment, the updated search results are generated based on a precategorization of objects presented as search results. For example, advertisements may be preassociated with various keywords that can be matched with the selected domain.

Figure 8:
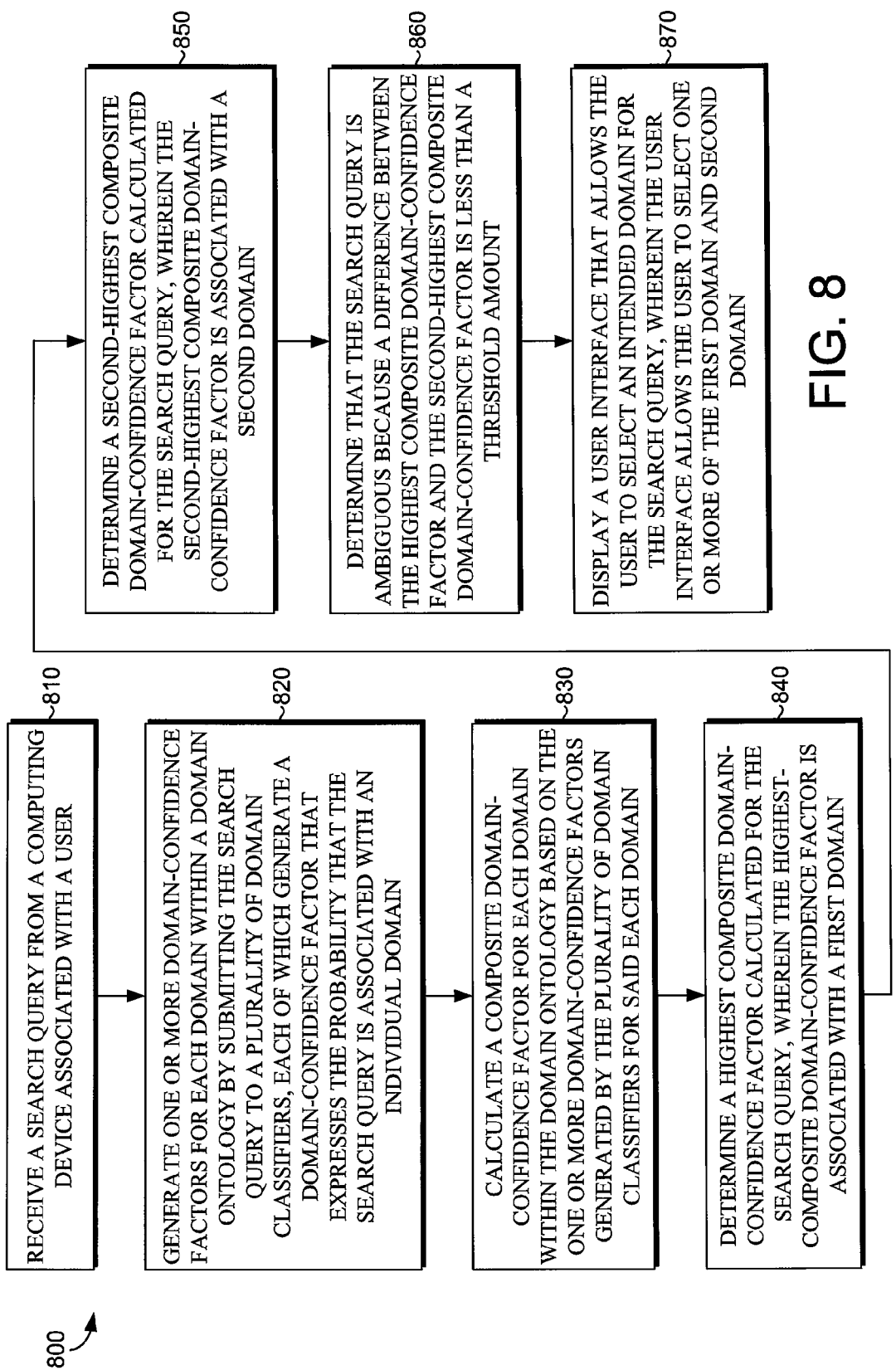
FIG. 8 is a flow chart showing a method of soliciting search-query domain information from a user that submits an ambiguous query, in accordance with an embodiment of the present invention.

Turning now to FIG. 8, a flow chart showing a method 800 of soliciting search-query domain information from a user that submits an ambiguous query is shown, in accordance with an embodiment of the present invention. Method 800 may be performed by a server associated with one or more search engines. The server could include components similar to those described with reference to search component 200. At step 810, a search query is received at the server from a computing device associated with a user. As described previously, the search query may be input into a search field on a search engine's web site. At step 820, one or more domain-confidence factors are generated for each domain within a domain ontology by submitting the search query to a plurality of domain classifiers. Each domain classifier generates a domain-confidence factor that expresses the probability that the search query is associated with an individual domain. The plurality of domain classifiers includes at least two domain classifiers that are associated with the same individual domain. As described previously, a domain is a subject-matter category.

At step 830, a composite domain-confidence factor is calculated for each domain within the domain ontology based on the one or more domain-confidence factors generated by the plurality of domain classifiers for each domain. As described previously, the composite domain-confidence factor may be generated by taking a weighted average of the one or more domain-confidence factors generated by the plurality of domain classifiers. There may need to be a normalization of the domain-confidence factors for a single domain if they are not all calculated on the same scale. For example, if a first domain-confidence factor is on a scale of 0 to 1 and a second domain-confidence factor is on a scale of 0 to 100, then the second domain-confidence factor may need to be divided by 100 to be normalized with the first domain-confidence factor. In one embodiment, all of the domain-confidence factors are calculated on the same scale. Nevertheless, when combining the domain-confidence factors different weight may be given to domain-confidence factors that are considered more reliable. Thus, a composite domain-confidence factor could be (0.8*a first domain-confidence factor+0.2*a second domain-confidence factor)/2. This is just one example and is not meant to be limiting. When only a single domain-confidence factor is calculated for a domain, then the single domain-confidence factor is the composite domain-confidence factor for that domain.

At step 840, a highest-composite domain-confidence factor is determined for the search query. The highest composite domain-confidence factor is associated with a first domain. At step 850, a second-highest composite domain-confidence factor is determined for the search query. The second-highest composite domain-confidence factor is associated with a second domain. At step 860, the search query is determined to be ambiguous because a difference between the highest composite domain-confidence factor and the second-highest composite domain-confidence factor is less than a threshold amount. At step 870, upon determining that the search query is ambiguous, a user interface is displayed that allows the user to select an intended domain for the search query. The user interface allows the user to select one or more of the first domain and the second domain. An example of such a user interface has been described previously with reference to FIG. 5.

Once a selection of a domain is received, updated results that are associated with content related to the selected domain may be presented. As described previously, the updated results may be generated by submitting a modified query to one or more search engines.

Figure 9:
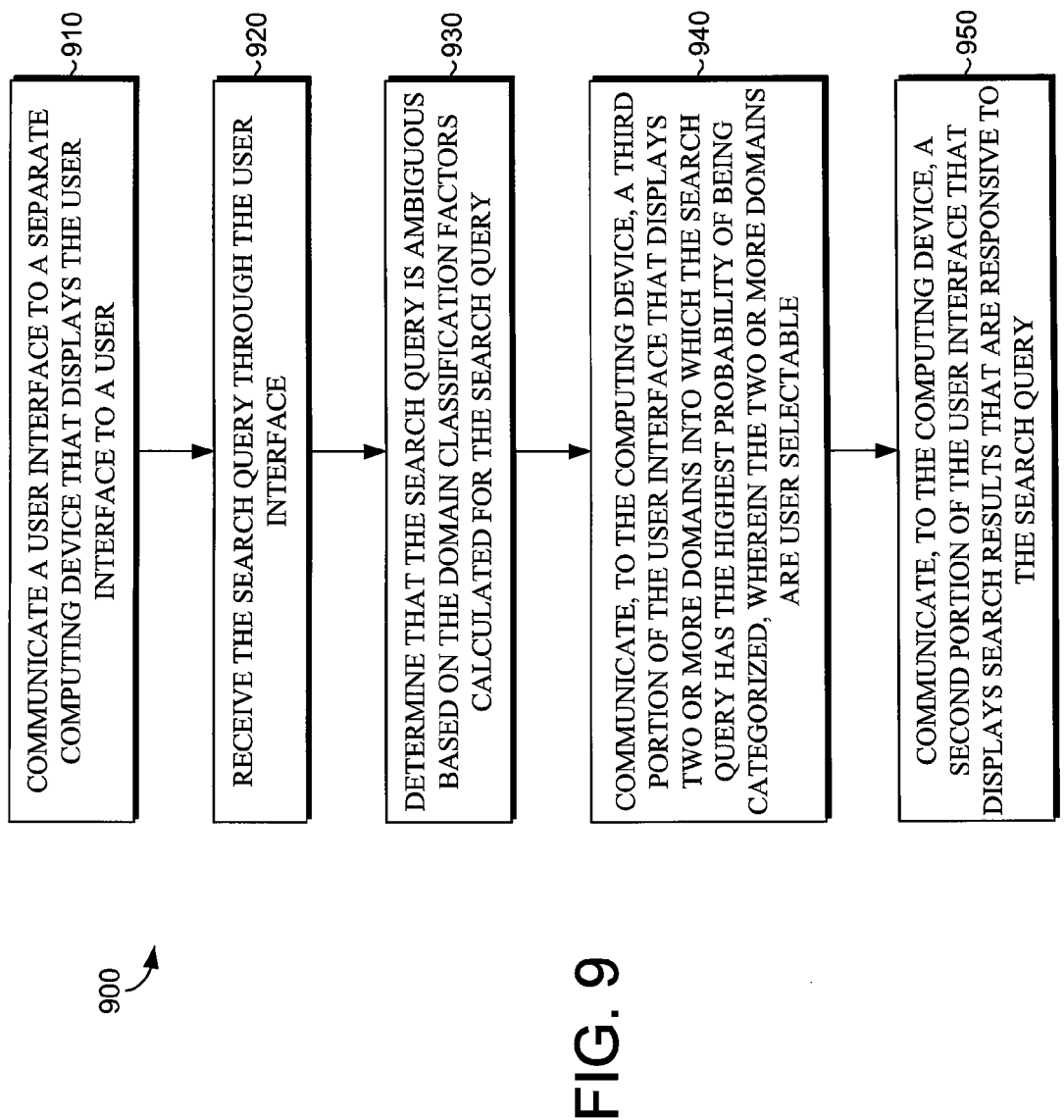
FIG. 9 is a flow chart showing a method of disambiguating a search query is shown, in accordance with an embodiment of the present invention.

Turning now to FIG. 9, a flow chart showing a method 900 of disambiguating a search query is shown, in accordance with an embodiment of the present invention. Method 900 may be performed on a server including components similar to those shown with reference to search component 200. At step 910, a user interface is communicated to a separate computing device that displays the user interface to a user. The user interface includes a first portion that receives a search query from the user. The first portion could be similar to query input field 510 described previously with reference to FIG. 5. At step 920, the search query is received through the user interface. At step 930, the search query is determined to be ambiguous based on the domain classification factors calculated for the search query. As described previously, the search query may be ambiguous when two or more domain classification factors are within a threshold amount. At step 940, a second portion of the user interface is communicated to the computing device. The second portion of the user interface displays two or more domains into which the search query has the highest probability of being categorized. The two or more domains are user selectable. The second portion may be similar to the disambiguation portion 515 described previously with reference to FIG. 5.

At step 950, a third portion of the user interface is communicated to the computing device. The third portion of the user interface displays search results that are responsive to the search query. The third portion may be similar to the web results portion 530 of FIG. 5.

In one embodiment, the user interface also includes a fourth portion for presenting advertisements and a fifth portion for presenting news articles to the user. The fourth portion may be similar to the advertisement results portion 540 described previously with reference to FIG. 5. The fourth portion may be similar to news results portion 550 described previously with reference to FIG. 5. Upon receiving the selection of a domain from the user, the search results may be updated. In addition, the advertisements and news articles presented may also be updated to reflect the selection of the domain by the user.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. One or more computing devices, each coupled to one or more hardware processors, the one or more computing devices having computer-executable instructions embodied thereon for performing a method of determining whether a search query is ambiguous, the method comprising:
    receiving, at a server, the search query sent from a computing device;
    generating initial search results that are responsive to the search query;
    identifying a plurality of domains, wherein each domain of the plurality of domains is a subject-matter category;
    generating a composite domain-confidence factor for each domain of the plurality of domains, wherein the composite domain-confidence factor for each domain of the plurality of domains is derived from multiple domain-confidence factors calculated by one or more domain classifiers, wherein the composite domain-confidence factor indicates a probability that the search query is associated with an individual domain;
    determining that the search query is ambiguous because a difference between a highest composite domain-confidence factor and a second-highest composite domain-confidence factor generated for the search query is less than a threshold value, wherein the highest composite domain-confidence factor is associated with a first domain and the second-highest composite domain-confidence factor is associated with a second domain; and
    in response to said determining that the search query is ambiguous, displaying a user interface that includes the initial search results for the search query and allows a user of the computing device to filter the initial search results according to the first domain or the second domain.

2. The one or more computing devices of claim 1, wherein the method further includes, prior to displaying the user interface, presenting search results responsive to the search query.

3. The one or more computing devices of claim 2, wherein the method further includes:
    receiving a domain selection from the user through the user interface; and
        displaying updated search results that are filtered based on the domain selection.

4. The one or more computing devices of claim 3, wherein the updated search results are generated by generating a modified query that includes the search query and a keyword associated with the domain selection and resubmitting the modified query to a search engine.

5. The one or more computing devices of claim 3, wherein the updated search results are generated by filtering the search results based on a domain category associated with each of the search results.

6. The one or more computing devices of claim 3, wherein the method further comprises transmitting the domain selection to an advertisement component that selects one or more advertisements that are displayed with the search results, wherein the one or more advertisements are in an advertising category associated with the domain selection.

7. The one or more computing devices of claim 1, wherein the composite domain-confidence factor for the individual domain is calculated using a weighted average of domain-confidence factors calculated by two or more domain classifiers for the individual domain.

8. A method of soliciting domain information from a user that submits an ambiguous search query, the method comprising:
- receiving, at a server, a search query from a computing device associated with the user;
- generating one or more domain-confidence factors for each domain within a domain ontology by submitting the search query to a plurality of domain classifiers, each of which generate a domain-confidence factor that expresses the probability that the search query is associated with an individual domain, wherein the plurality of domain classifiers includes at least two domain classifiers that are associated with the individual domain, and wherein a domain is a subject-matter category;
- calculating a composite domain-confidence factor for said each domain within the domain ontology based on multiple domain-confidence factors generated by the plurality of domain classifiers for said each domain;
- determining a highest composite domain-confidence factor calculated for the search query, wherein the highest composite domain-confidence factor is associated with a first domain;
- determining a second-highest composite domain-confidence factor calculated for the search query, wherein the second-highest composite domain-confidence factor is associated with a second domain;
- determining that the search query is ambiguous because a difference between the highest composite domain-confidence factor and the second-highest composite domain-confidence factor is less than a threshold amount; and
- upon said determining that the search query is ambiguous, displaying a user interface that allows the user to select an intended domain for the search query, wherein the user interface allows the user to select one or more of the first domain and the second domain.

9. The method of claim 8, wherein the composite domain-confidence factor for the individual domain is calculated using a weighted average of domain-confidence factors calculated by two or more domain classifiers for the individual domain.

10. The method of claim 8, wherein the method further comprises receiving a selection of the first domain from the computing device associated with the user and displaying search results updated with content related to the first domain.

11. The method of claim 10, wherein the method further comprises generating the search results updated with the content related to the first domain by searching a data source using a new query that includes the search query and one or more words that describe the first domain.

12. The method of claim 11, wherein the data source is one or more of a group of advertisements, an index of web pages, and an index of news articles.

13. The method of claim 10, wherein the method further comprises generating the search results associated with the content related to the first domain by selecting pre-categorized search results from a data source that are categorized into the first domain.

14. One or more computing devices, each coupled to one or more hardware processors, the one or more computing devices having computer-executable instructions embodied thereon for performing a method of disambiguating a search query, the method comprising:
- communicating a user interface to a separate computing device that displays the user interface to a user, wherein the user interface includes a first portion that receives the search query from the user;
- receiving the search query through the user interface;
- generating one or more domain-confidence factors for each domain within a domain ontology by submitting the search query to a plurality of domain classifiers, each of which generate a domain-confidence factor that expresses the probability that the search query is associated with an individual domain, wherein the plurality of domain classifiers includes at least two domain classifiers that are associated with the individual domain, and wherein a domain is a subject-matter category;
- calculating a composite domain-confidence factor for said each domain within the domain ontology based on multiple domain-confidence factors generated by the plurality of domain classifiers for said each domain;
- determining a highest composite domain-confidence factor calculated for the search query, wherein the highest composite domain-confidence factor is associated with a first domain;
- determining a second-highest composite domain-confidence factor calculated for the search query, wherein the second-highest composite domain-confidence factor is associated with a second domain;
- determining that the search query is ambiguous because a difference between the highest composite domain-confidence factor and the second-highest composite domain-confidence factor is less than a threshold amount, wherein said determining that the search query is ambiguous is further based on a closeness of the domains in the domain ontology; and
- communicating, to the separate computing device, a second portion of the user interface that displays two or more domains into which the search query has a highest probability of being categorized, wherein the two or more domains are user selectable.

15. The one or more computing devices of claim 14, wherein the method further comprises receiving a selection of the first domain from the separate computing device associated with the user and displaying search results associated with content related to the first domain.

16. The one or more computing devices of claim 14, wherein the method further comprises communicating, to the separate computing device, a third portion of the user interface that displays search results that are responsive to the search query.

17. The one or more computing devices of claim 16, wherein the user interface also includes a fourth portion for presenting advertisements to the user and a fifth portion for presenting news articles to the user.

18. The one or more computing devices of claim 14, wherein the search query is determined not to be ambiguous despite having one or more composite domain-confidence factors within a threshold amount when one or more domain-confidence factors are associated with closely related domains.

19. The one or more computing devices of claim 18, wherein domains that are parent and child nodes in a domain ontology are closely related.

* * * * *